(12) United States Patent
Contegno

(10) Patent No.: US 11,443,519 B2
(45) Date of Patent: Sep. 13, 2022

(54) METHOD AND SYSTEM FOR DETERMINING THE DIGITAL FINGERPRINT OF VEHICLES IN TRANSIT

(71) Applicant: SINELEC S.p.A., Tortona (IT)

(72) Inventor: Pietro Contegno, Tortona (IT)

(73) Assignee: SINELEC S.p.A., Tortona (IT)

( * ) Notice: Subject to any disclaimer, the term of this patent is extended or adjusted under 35 U.S.C. 154(b) by 240 days.

(21) Appl. No.: 16/868,358

(22) Filed: May 6, 2020

(65) Prior Publication Data

US 2020/0356787 A1    Nov. 12, 2020

(30) Foreign Application Priority Data

May 8, 2019    (IT) .......................... 102019000006648

(51) Int. Cl.
*G06V 20/54*    (2022.01)
*H04W 4/80*    (2018.01)
(Continued)

(52) U.S. Cl.
CPC ............ *G06V 20/54* (2022.01); *G06N 20/00* (2019.01); *G07B 15/063* (2013.01); *G08G 1/017* (2013.01);
(Continued)

(58) Field of Classification Search
CPC .. G06V 20/54; G06V 20/625; G06V 2201/08; G07B 15/063; G08G 1/0112; G08G 1/0116; G08G 1/0129; G08G 1/015; G08G 1/017; G08G 1/0175; G08G 1/04; H04W 4/40; H04W 4/80
See application file for complete search history.

(56) References Cited

U.S. PATENT DOCUMENTS 5,859,415 A * 1/1999 Blomqvist ........... G07B 15/063
                                                235/382
6,109,525 A * 8/2000 Blomqvist ............. G01C 11/02
                                                235/382
(Continued)

FOREIGN PATENT DOCUMENTS

EP    2 518 695    10/2012
GB    2 266 398    10/1993
WO    WO 94/28516    12/1994

OTHER PUBLICATIONS

IT 201900006648—Italian Search Report dated Jan. 6, 2020.

*Primary Examiner* — David Bilodeau
(74) *Attorney, Agent, or Firm* — Aldo Noto; Davidson Berquist Jackson & Gowdey LLP

(57) ABSTRACT

A method for determining the digital fingerprint of vehicles in transit for automatic charge of tolls, fees and/or other possible treatments, comprises the steps of: providing at least one portal along a road with at least one pair of cameras respectively facing upstream and downstream of the portal and with at least one antenna configured to interrogate vehicle on-board devices to receive an identification code therefrom; processing images and signals from the cameras and the antenna to assign each vehicle a series of data which together define a digital fingerprint of each vehicle, in particular by tracking each vehicle shot by the cameras along a track and obtaining from the images acquired along the track data which are used by a classification algorithm for classifying the vehicles.

21 Claims, 1 Drawing Sheet

(51) Int. Cl.
  *H04W 4/40* (2018.01)
  *G06N 20/00* (2019.01)
  *G07B 15/06* (2011.01)
  *G08G 1/017* (2006.01)
  *G06V 20/62* (2022.01)

(52) U.S. Cl.
  CPC ............... *H04W 4/40* (2018.02); *H04W 4/80* (2018.02); *G06V 20/625* (2022.01); *G06V 2201/08* (2022.01)

(56) References Cited

U.S. PATENT DOCUMENTS

| | | | | |
|---|---|---|---|---|
| 6,337,639 B1* | 1/2002 | Kojima | ................ | G07B 15/063 340/928 |
| 6,538,580 B2* | 3/2003 | Bostrom | ................ | G08G 1/017 340/928 |
| 6,661,352 B2* | 12/2003 | Tiernay | ................ | G07B 15/063 340/928 |
| 6,892,942 B1* | 5/2005 | Widl | ................ | G07B 15/063 235/379 |
| 6,937,162 B2* | 8/2005 | Tokitsu | ................ | G07B 15/063 701/32.4 |
| 7,233,260 B2* | 6/2007 | Tang | ................ | G08G 1/017 705/13 |
| 7,262,711 B2* | 8/2007 | Zhu | ................ | G07B 15/063 705/13 |
| 7,385,525 B2* | 6/2008 | Ho | ................ | G07B 15/063 340/936 |
| 2005/0195383 A1* | 9/2005 | Breed | ................ | G01S 7/4802 356/28 |
| 2006/0278705 A1* | 12/2006 | Hedley | ................ | G07B 15/063 235/382 |
| 2007/0008179 A1* | 1/2007 | Hedley | ................ | G06V 20/63 340/928 |
| 2011/0288909 A1* | 11/2011 | Hedley | ................ | G06Q 30/0283 705/13 |
| 2014/0056520 A1* | 2/2014 | Rodriguez Serrano | ................ | G06K 9/6232 382/173 |
| 2017/0008521 A1* | 1/2017 | Braunstein | ................ | G05D 1/0219 |
| 2020/0134931 A1* | 4/2020 | Gillies | ................ | G07B 15/06 |

* cited by examiner

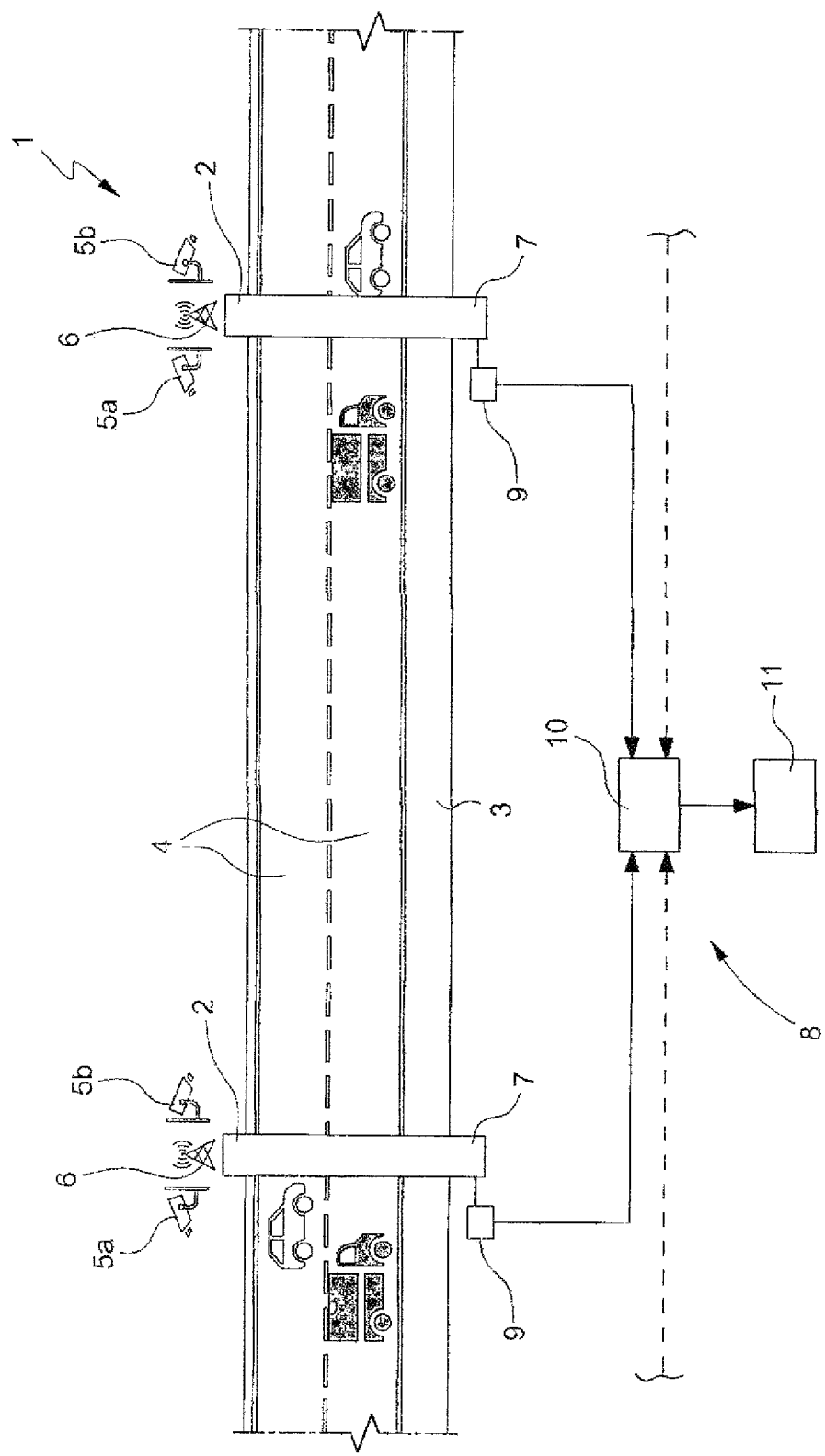

METHOD AND SYSTEM FOR DETERMINING THE DIGITAL FINGERPRINT OF VEHICLES IN TRANSIT

CROSS-REFERENCE TO RELATED APPLICATIONS

This patent application claims priority from Italian patent application no. 102019000006648 filed on May 8, 2019, the entire disclosure of which is incorporated herein by reference.

TECHNICAL FIELD

The present invention relates to a method and a system for determining the digital fingerprint of vehicles in transit, to be used for various purposes such as for example automatic charging of tolls, fees, penalties, traffic monitoring and control, or the like.

The invention finds particularly advantageous application in automatic charging of tolls, fees, etc. to vehicles in transit, an application to which explicit reference will be made hereinafter purely by way of non-limiting example, since the invention can be extended to various other uses and applications.

In particular, the invention relates to a method and a system of the so-called free-flow type, i.e. which allow automatic charging of tolls, fees, etc. to vehicles in transit without the need to stop the vehicles.

BACKGROUND OF THE INVENTION

Free-flow charging systems and methods, also known as automatic dynamic charging, are known, which allow the charging of fees, for example motorway tolls or for access to traffic-restricted areas, without the need to stop the vehicle at a payment station.

For example, a widespread system for collecting motorway tolls is based on a network of fixed stations, normally installed at the entrances and exits of the toll sections, connected to a processing station and communicating with mobile devices installed on the vehicles.

The stations are equipped with sensors for the acquisition of data on vehicles in transit, which together with the data received from the mobile devices are used to identify vehicles and charge the fees due.

In general, the known free-flow systems therefore require the acquisition and processing of various parameters for the identification and classification of vehicles. In particular, the known systems are based on the acquisition of signals emitted by vehicle on-board devices, the reading of the plates, and the classification of the vehicles, carried out for example through inductive coils embedded in the asphalt or radar systems that detect the shape of the vehicles.

The system can proceed with the charging only in the event of perfect correspondence between all the parameters detected.

The devices that detect the identification parameters from vehicles in transit, however, are normally subject to errors. The question thus arises as to how to handle doubtful cases, that is, cases exhibiting incongruences between the data collected.

In the known systems, the checking of all doubtful or problematic cases is delegated to so-called back-office operations: the case data that cannot be automatically processed by the system are thus sent to an operator who checks them and, if possible, tries to solve any incongruences.

In fact, the known systems are not able to automatically proceed with the assessment of the acquired data to solve any incongruences.

Clearly, these operating methods have a substantial cost.

In any case, then, the known systems require relatively complicated and expensive devices and apparatuses and therefore have installation, maintenance and operating costs which can also be very high.

The known systems and methods mentioned herein may therefore be not fully satisfactory, being complicated and expensive to install and use, above all in terms of reliability due to the high incidence of doubtful cases that, ultimately, cannot be charged.

SUMMARY OF THE INVENTION

It is an object of the present invention to provide a method and a system for automatic charging of vehicles, which are free from the drawbacks of the prior art described herein.

The present invention therefore relates to a method and a system for automatic charging of vehicles as defined in essential terms in the annexed claims 1 and 11, respectively, as well as in the dependent claims relating to additional preferred features.

BRIEF DESCRIPTION OF THE DRAWINGS

The invention is further described in the following non-limiting embodiments, with reference to the attached FIGURE which schematically represents an automatic charging system for vehicles according to the invention.

In the attached FIGURE, number 1 indicates, as a whole, an automatic charging system for vehicles.

DETAILED DESCRIPTION OF THE INVENTION

In the non-limiting embodiment described herein, the system 1 is intended for the collection of tolls for the transit of vehicles on a toll road. It is understood that the system 1 of the invention can also find application in other fields and for the collection of other types of fees.

The system 1 comprises at least one portal 2 located along a road 3. Suitably, the system 1 comprises a plurality of portals 2 located along the road 3 and spaced apart from one another along the road 3.

FIG. 1, for example, shows two portals 2 arranged in succession in the normal direction of travel of the vehicles along the road 3, which is a multi-lane road having a plurality of lanes 4, possibly intended for opposite directions of travel.

Clearly, each portal 2 can be extended and therefore can operate on one or more lanes 4, even in opposite directions of travel, of the road 3.

Each portal 2 comprises, for each lane 4 served by the portal 2:

a pair of cameras 5a, 5b respectively facing upstream and downstream of the portal 2 in the direction of travel of the vehicles on the lane 4; the camera 5a is positioned so as to shoot frontally the vehicles approaching the portal 2; the camera 5b is positioned so as to shoot from behind the vehicles which, having passed the portal 2, move away from it;

an antenna 6, in particular a DSRC antenna for dedicated short-range communication with on-board devices possibly present on vehicles in transit.

The cameras 5a, 5b and the antenna 6 are installed on a support frame 7, for example bridged over the road 3. It is understood that the frame 7 can have different shapes and other configurations of the portal 2 are possible.

Each camera 5a, 5b is provided with two different optical systems having respective focal lengths: a first optical system comprising, for example, a teleobjective (for example, with a focal length of about 25 mm), is used to frame the plates of the vehicles and is preferably associated with an infrared illuminator; a second optical system comprising, for example, a wide-angle lens (for example, with a focal length of about 12 mm) is used to track the trajectories of the vehicles.

In one embodiment, the cameras 5a, 5b operate in the visible spectrum, i.e. they are equipped with elements sensitive to visible light.

In an alternative embodiment, which is more efficient under poor visibility conditions, for example at night or in case of fog, the cameras 5a, 5b are IR cameras operating in the infrared field. Therefore, the cameras 5a, 5b are provided with elements sensitive to infrared light, in particular having a wavelength between about 2 and about 15 μm and preferably between about 5 and about 12 μm, for example 7-10 μm. In this way, the cameras 5a, 5b are not affected by the lighting conditions (day/night, bad weather).

The antenna 6 is configured to interrogate vehicle on-board devices (for example, a transponder) to receive in response an identification code therefrom.

Optionally, the system 1 can comprise auxiliary sensors, located on the portal 2 or in the proximity of the portal 2, for detecting further parameters of the vehicles in transit, such as for example a weight sensor (for example, embedded in the asphalt of the road 3) for detecting the total weight and/or the weight per axle of the vehicles.

The system 1 further comprises a data processing system 8, connected to the portals 2, and in particular to the cameras 5a, 5b and the antenna 6 (as well as any auxiliary sensors) of each portal 2, and configured so as to process images and signals from the cameras 5a, 5b and the antenna 6 for assigning each vehicle a series of data which together define a (virtual) digital fingerprint of each vehicle, as will be further described below.

The data processing system 8 can be variously configured, and in particular comprise one or more distinct, variously located and connected processing units.

In the merely exemplary embodiment illustrated and described herein (but not necessarily), the data processing system 8 comprises a local processing unit 9 positioned on each portal 2 and connected to the cameras 5a, 5b and to the antenna 6 of the respective portal 2 for processing data therefrom; and a central processing unit 10, which is connected to the local processing units 9 of the portals 2 and receives and processes the data transmitted by the local processing units 9.

It is understood that the data processing system 8 can be differently structured and that the processing functions described below with reference to the local processing units 9 can be performed by the central processing unit 10 and/or vice versa. The subdivision of functions and logical operations among the local processing units 9 and the central processing unit 10 as described below is therefore to be understood as purely exemplary and in no way limiting.

The cameras 5a, 5b frame respective sections of the road 3 and acquire images of the vehicles in transit.

The cameras 5a, 5b are configured to shoot each vehicle along a route.

The local processing unit 9 connected to the cameras 5a, 5b acquires the images taken by the cameras 5a, 5b, and through algorithms loaded in the local processing unit 9 processes the images for assigning each vehicle a series of data which together define a (virtual) digital fingerprint of each vehicle.

Image processing allows, in particular, for each vehicle framed, the assignment of a timestamp corresponding to the passage of the vehicle; the reading of the front plate and the rear plate of the vehicle; the calculation of the dimensions and/or outline of the vehicle and the association of a class and/or a type of vehicle to the vehicle; the determination of the lane travelled by the vehicle; optionally, the determination of one or more other parameters of the vehicle, such as colour, make (manufacturer), model, etc.

In particular, the local processing unit 9 is configured to process the images acquired by the cameras 5a, 5b and:
  track each vehicle filmed by the cameras 5a, 5b to follow the route of each vehicle;
  obtain, from the images acquired along the route, data (for example: shape, outline, dimensions, etc.) that are used by a classification algorithm loaded in the local processing unit 9 for classifying the vehicles, in particular for determining whether the filmed vehicle is a car, a truck, a motorcycle, etc.

According to the invention, the local processing unit 9 is provided with machine learning algorithms for data acquisition and association to define the fingerprints of the vehicles.

The antenna 6 interrogates the vehicle on-board devices and receives in response therefrom a signal representative of an identification code of the vehicle, which in turn is included in the vehicle's fingerprint along with the other acquired data.

Each fingerprint therefore consists of a data string representative of various parameters of the vehicle.

All the data acquired by the portal 2 through the cameras 5a, 5b and the antenna 6 (and possibly through the auxiliary sensors) and processed by the local processing unit 9 are then transmitted to the central processing unit 10.

In turn, the central processing unit 10 is equipped with an artificial intelligence engine and machine learning algorithms, with which it processes the transmitted data.

In particular, the central processing unit 10 compares the data transmitted by the portals 2 to solve any incongruences. The artificial intelligence engine compares all the detected fingerprints (i.e. all the data strings acquired by the portals 2) and can automatically correct a possible error in a single data item when all the remaining data referred to the same fingerprint and therefore to the same vehicle are consistent with and confirmed by other fingerprints.

For example, an error in reading one digit of a plate is corrected if all the other detected data of the same fingerprint are consistent.

The artificial intelligence engine of the central processing unit 10, after carrying out the checks, calculates the due fee according to the fingerprint of the vehicle and transmits the data to a payment system 11, known per se, so as to charge the fee.

The advantages of the invention compared to the prior art are clear from the foregoing.

Firstly, the portal 2 has an extremely simple structure, requiring a limited number of devices installed on the portal 2: in essence, the portal 2 only requires the cameras 5a, 5b and the antenna 6.

As a result, the installation, initial configuration and subsequent maintenance of the portal 2 are simplified.

Furthermore, the data correlation methods are definitely improved, as they are managed by an artificial intelligence engine equipped with machine learning algorithms.

In this way, the system 1 of the invention manages to significantly reduce the ambiguous cases and ultimately increase the certain cases sent to the payment system for the charging.

The data acquired by the system 1 can then be used for other purposes, for example for assessing and controlling traffic, detecting and possibly sanctioning incorrect or dangerous conduct, etc.

Lastly, it is understood that the method and the system for automatic charging of vehicles as described and illustrated herein can be subject to further modifications and variations that do not depart from the scope of the accompanying claims.

The invention claimed is:

1. A method for determining the digital fingerprint of vehicles in transit for automatic charge of tolls, fees and/or other possible treatments, comprising the steps of:
providing at least one portal (2) along a road (3) with at least one pair of cameras (5a, 5b) respectively facing upstream and downstream of the portal (2) in the direction of travel of vehicles on at least one lane (4) of the road (3) to shoot frontally the vehicles approaching the portal (2) and, respectively, from behind the vehicles which, having passed the portal (2), move away from it; and with at least one antenna (6), in particular a DSRC antenna for dedicated short-range communication, configured to interrogate vehicle on-board devices to receive an identification code therefrom;
processing images and signals from the cameras (5a, 5b) and the antenna (6) to assign each vehicle a series of data which together define a digital fingerprint of each vehicle;
wherein the step of processing images and signals is carried out by an artificial intelligence engine to solve possible incongruences and comprises the steps of: comparing all the detected digital fingerprints and automatically correcting an error in a single data item when all the remaining data referred to the same digital fingerprint and to the same vehicle are consistent with and confirmed by other digital fingerprints;
the method being characterized in that the step of processing images and signals comprises the steps of:
processing images acquired by the cameras (5a, 5b) and tracking each vehicle shot by the cameras (5a, 5b) along a track; and
obtaining from the images acquired along the track data which are used by a classification algorithm for classifying the vehicles.

2. The method according to claim 1, wherein the step of processing images and signals comprises the steps of: assigning a timestamp corresponding to the passage of the vehicle; reading the front plate and the rear plate of the vehicle; calculating the dimensions and/or outline of the vehicle and associating a class and/or a type of vehicle to the vehicle.

3. The method according to claim 1, wherein the step of processing images and signals is carried out by machine learning algorithms for data acquisition and association to define the digital fingerprints of the vehicles.

4. The method according to claim 1, wherein a plurality of portals (2) are arranged spaced apart from one another along the road (3).

5. The method according to claim 1, wherein each camera (5a, 5b) is provided with two different optical systems having respective focal lengths; a first optical system comprising a teleobjective, a second optical system comprising a wide-angle lens.

6. The method according to claim 1, wherein the cameras (5a, 5b) are IR cameras operating in the infrared field.

7. The method according to claim 6, wherein the cameras (5a, 5b) are provided with elements sensitive to infrared light, in particular having a wavelength between 2 and 15 µm and preferably between 5 and 12 µm.

8. The method according to claim 1, wherein the step of processing images and signals comprises a step of interrogating the vehicle on-board devices by means of the antenna (6) and receiving in response a signal representative of an identification code of the vehicle, which is in turn included in the digital fingerprint of the vehicle.

9. The method according to claim 1, used for collecting fees, such as tolls for transit of vehicles on a toll road, and comprising a step of calculating a due fee according to the digital fingerprint of the vehicle, and transmitting said fee to a payment system (11).

10. A system (1) for determining the digital fingerprint of vehicles in transit for automatic charge of tolls, fees and/or other possible treatments, comprising at least one portal (2) positioned along a road (3) and provided with at least one pair of cameras (5a, 5b) respectively facing upstream and downstream of the portal (2) in the direction of travel of vehicles on at least one lane (4) of the road (3) to shoot frontally the vehicles approaching the portal (2) and, respectively, from behind the vehicles which, having passed the portal (2), move away from it; and with at least one antenna (6), in particular a DSRC antenna for dedicated short-range communication, configured to interrogate vehicle on-board devices to receive an identification code therefrom; the system (1) further comprising a data processing system (8), connected to the cameras (5a, 5b) and the antenna (6) and configured so as to process images and signals from the cameras (5a, 5b) and the antenna (6) for assigning each vehicle a series of data which together define a digital fingerprint of each vehicle, wherein the data processing system (8) is provided with an artificial intelligence engine to solve possible incongruences; the artificial intelligence engine being configured so as to compare all the detected digital fingerprints and automatically correct any errors in a single data item when all the remaining data referred to the same digital fingerprint and to the same vehicle are consistent with and confirmed by other digital fingerprints;
the system (1) being characterized in that the data processing system (8) is configured so as to:
process images acquired by the cameras (5a, 5b) and track each vehicle shot by the cameras (5a, 5b) along a track; and
obtain from the images acquired along the track data which are used by a classification algorithm loaded on the data processing system (8) for classifying the vehicles.

11. The system according to claim 10, wherein, for each vehicle shot by a camera (5a, 5b), the data processing system (8): assigns a timestamp corresponding to the passage of the vehicle; reads the front plate and the rear plate of the vehicle; calculates the dimensions and/or outline of the vehicle and associates a class and/or a type of vehicle to the vehicle.

12. The system according to claim 10, wherein the data processing system (8) is provided with machine learning algorithms for data acquisition and association to define the digital fingerprints of the vehicles.

13. The system according to claim 10, wherein the data processing system (8) comprises a local processing unit (9) positioned on the portal (2) and connected to the cameras (5a, 5b) and to the antenna (6) of the portal (2); and a central processing unit (10) connected to the local processing unit (9) and configured to receive and process data transmitted by the local processing unit (9).

14. The system according to claim 10, comprising a plurality of portals (2) arranged spaced apart from one another along the road (3).

15. The system according to claim 10, wherein each camera (5a, 5b) is provided with two different optical systems having respective focal lengths; a first optical system comprising a teleobjective, a second optical system comprising a wide-angle lens.

16. The system according to claim 10, wherein the cameras (5a, 5b) are IR cameras operating in the infrared field.

17. The system according to claim 16, wherein the cameras (5a, 5b) are provided with elements sensitive to infrared light, in particular having a wavelength between 2 and 15 μm and preferably between 5 and 12 μm.

18. The system according to claim 10, wherein the antenna (6) is configured so as to interrogate the vehicle on-board devices and to receive in response a signal representative of an identification code of the vehicle, which is in turn included in the digital fingerprint of the vehicle.

19. The system according to claim 10, used for collecting fees, such as tolls for transit of vehicles on a toll road, and comprising a payment system (11) connected to the data processing system (8), and wherein the data processing system (8) is configured so as to calculate and transmit to the payment system (11) a due fee according to the digital fingerprint of the vehicle.

20. The method according to claim 2, wherein the step of processing images and signals comprise the step of determining one or more other parameters of the vehicle selected from color, brand, model, and lane used by the vehicle.

21. The system according to claim 11, wherein the data processing system determines one or more other parameters of the vehicle selected from color, brand, model, and lane used by the vehicle.

* * * * *